United States Patent [19]

Wärnelöv

[11] Patent Number: 4,896,745

[45] Date of Patent: Jan. 30, 1990

[54] ADJUSTABLE BASE FOR LADDERS AND LIKE OBJECTS

[76] Inventor: Johnny Wärnelöv, Södergatan 39, S-573 00 Tranås, Sweden

[21] Appl. No.: 303,728

[22] PCT Filed: Jul. 10, 1987

[86] PCT No.: PCT/SE87/00331

§ 371 Date: Jan. 19, 1989

§ 102(e) Date: Jan. 19, 1989

[87] PCT Pub. No.: WO88/00669

PCT Pub. Date: Jan. 28, 1988

[30] Foreign Application Priority Data

Jul. 22, 1986 [SE] Sweden ................................ 8603182

[51] Int. Cl.⁴ ......................... F16M 11/00; E06C 7/44

[52] U.S. Cl. .................................. 182/200; 248/188.2

[58] Field of Search ................................ 182/200–205; 248/188.2

[56] References Cited

U.S. PATENT DOCUMENTS 973,509 10/1910 Ison ..................................... 182/200

1,088,167 2/1914 Osterhoudt .................. 248/188.2 X

FOREIGN PATENT DOCUMENTS 469181 4/1969 Switzerland ........................ 182/200

*Primary Examiner*—Alvin C. Chin-Shue

*Attorney, Agent, or Firm*—Davis, Bujold & Streck

[57] ABSTRACT

An adjustable ladder base assembly for compensating an uneven foundation surface and/or to enable a ladder to be inclined at a given angle. The base assembly includes an arcuate bottom structure having footplate devices which can be brought into contact with the foundation surface, a strut which connects the two sides of the arcuate structure, and an attachment structure which is pivotally mounted to the strut and to the arcuate part and which is intended to support the ladder in a raised position. The attachment structure includes an upper, transverse bar which supports holding means for securing the sidepieces of the ladder. The bar is firmly connected by a spacer means, with a lower, transversely extending and upwardly open channel section which is intended to receive a rung of the ladder. The spacer means can be clamped to the arcuate part by the friction locking action of an upper, transversely extending U-shaped strut which embraces the arcuate part and is pivotally mounted to the strut via a lower arm.

8 Claims, 3 Drawing Sheets

ADJUSTABLE BASE FOR LADDERS AND LIKE OBJECTS

The present invention relates to an adjustable base assembly of the kind set forth in the preamble of claim 1.

The inventive adjustable base assembly is intended to support an elongated object in various, adjustable positions of inclination relative to a foundation surface. In a first application mode, the inventive base assembly is effective in supporting the objects, e.g. a ladder or platform, in a vertical or horizontal position relative to an irregular or uneven foundation surface. In a second assembly mode, the inventive base assembly is effective in supporting the object with said object inclined in relation to the horizontal.

Such adjustable base assemblies are known to the art and essentially consist of an arcuate part which incorporates a supportive bottom structure and an attachment structure which can be adjusted to different positions of inclination on the bottom structure and which is provided with fastener devices for securing the object to be supported, normally a ladder. The bottom structure will normally include footplates which are pivotally jointed for safe abutment with uneven or irregular foundation surfaces. The known base assembly may alternatively be equipped with feet which have pointed ends, such as to enable the feet to be driven into an uneven foundation surface and thereby secure the adjustable base assembly.

These known base assemblies, however, are encumbered with a number of drawbacks and deficiencies. For example, with the magority of such known base assemblies the fastener devices have fixed positions on the bottom structure, thereby preventing, e.g. the ladder from being placed exactly in the position desired, without the ladder leaning to one side. When the ladder is very long, this deficiency can have serious consequences. Furthermore, the known fastener devices intended for securing a ladder to such a ladder base assembly are often of complicated construction and are difficult to use, which can result in unsafe and/or unstable securement of the ladder to the base assembly.

In the case of other known ladder base assemblies, the fastener devices provided can only be used with ladders of given dimensions or solely with a given type of ladder which is particularly constructed for use with the known ladder base assembly. These fastener devices include stationary sockets for receiving the sidepieces of the ladder, and bolts which extend through holes formed in the ladder sidepieces and the lower rung of the ladder. The provision of through passing bolt holes results in fractural impressions and weakens the ladder.

The means used in known ladder base assemblies of this kind for supporting the base assembly against an underlying support surface, or foundation surface, also have deficiencies. For example, pointed feet on the bottom structure cannot be used on sensitive or delicate foundation surfaces, such as floor surfaces, for example. On the other hand, the foot plates are often constructed for movement in all directions, e.g. in the form of universal joints and overlarge pin holes which enable the feet to skew relative to the horizontal. This foot plate arrangement is both insecure and unsafe and can allow the footplate to shift suddenly during use and therewith move out of position.

In view of the aforesaid deficiencies inherent with known supportive base assemblies of this kind, the object of the present invention is to provide an improved adjustable base assembly which can be used universally for ladders and/or other elongated objects of all types and sizes; which will afford positive and stable attachment of the ladder or object without needing to modify the ladder or object in a way which will impair its mechanical strength; and which will enable the ladder or object to be adjusted to all angles of inclination smoothly and continuously. A further object of the invention is to provide an adjustable base assembly which will rest securely and safely against all conceivable underlying foundation surfaces, without causing damage thereto, and which has a simple, reliable and uncomplicated construction and can be manufactured at low costs.

These objects are achieved with a base assembly of the aforedescribed kind having the characteristic features set forth in the characterizing clause of claim 1.

The invention will now be described in greater detail with reference to a non-limiting embodiment thereof and with reference to the accompanying drawings, in which FIG. 1 is a side view seen from the front of an adjustable base assembly constructed in accordance with the invention;

Figure 1:
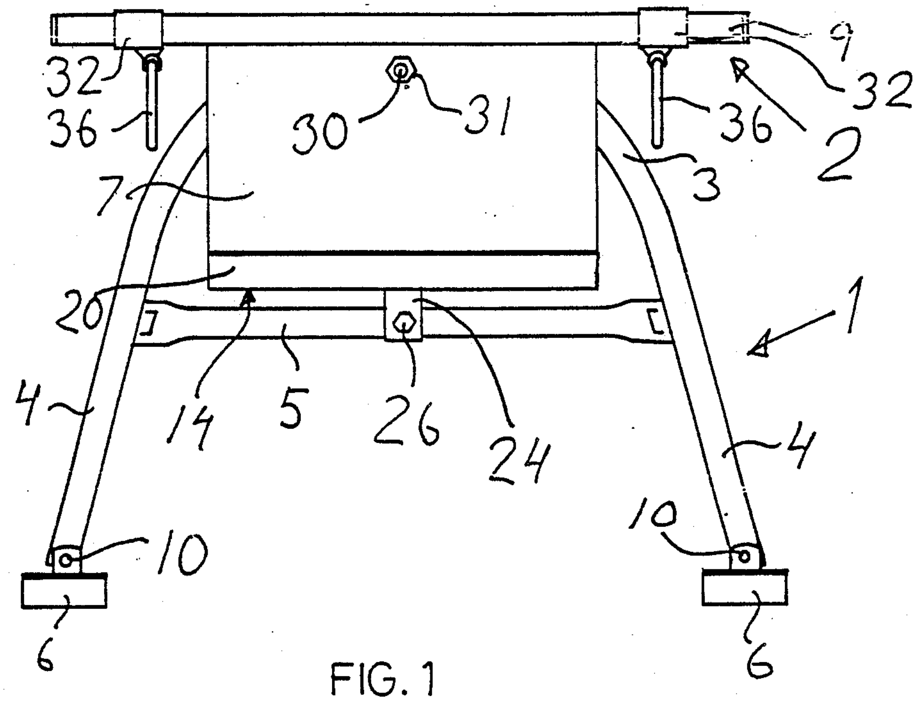
Figure 2:
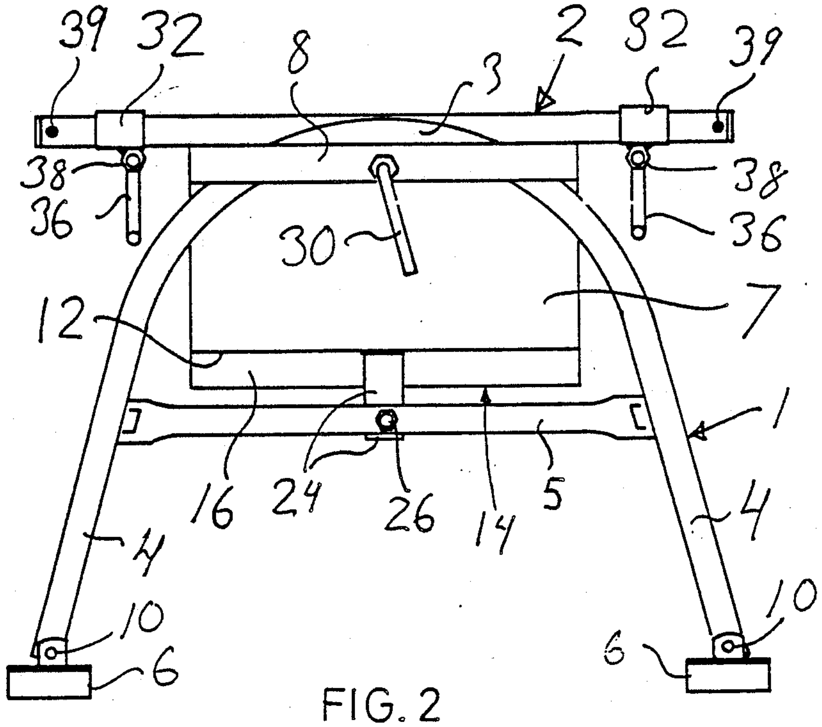
FIG. 2 is a side view seen from the rear of the base assembly of FIG. 1.
Figure 3:
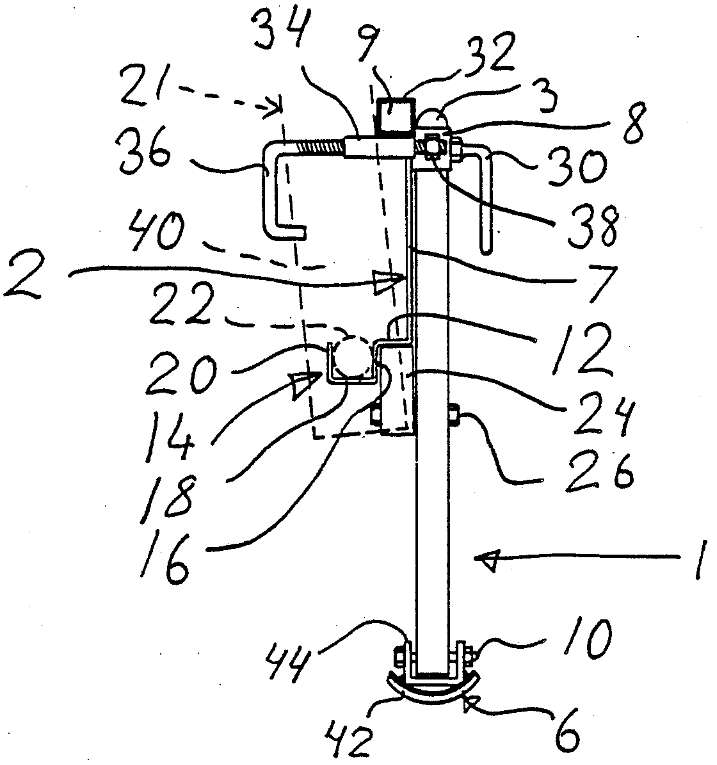
FIG. 3 is a view seen from one short end of the base assembly of FIG. 1.
Figure 4:
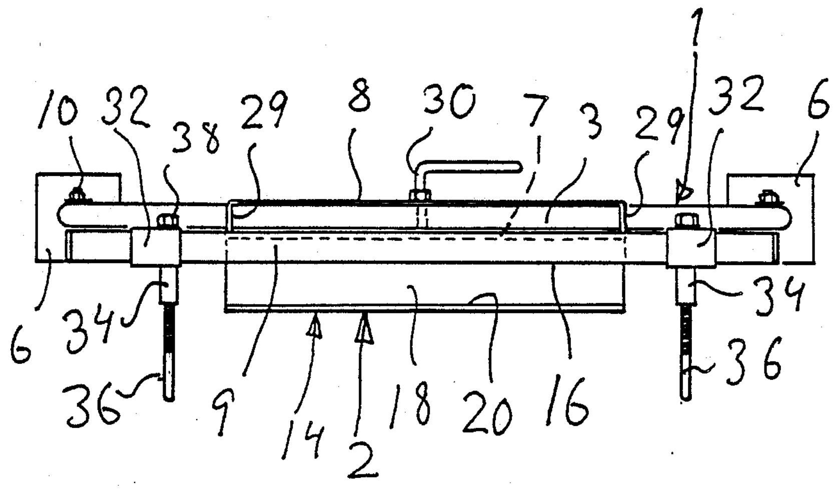
FIG. 4 is an overhead view of the base assembly of FIG. 1.

FIGS. 1–4 show different views of an adjustable base assembly constructed in accordance with the invention and comprising a bottom structure, generally referenced 1, and a ladder attachment structure generally referenced 2. The bottom structure 1 comprises an arcuate or curved part 3 and a cross-strut 5, wherewith the ends of the arcuate part 3 are substantially straight, such as to form legs 4. Connected to the extremities of legs 4 are footplate devices 6, which are pivotally connected to said legs by means of bolts 10 or like fasteners. The footplate devices and their manner of attachment will be described in more detail hereinafter.

The attachment structure 2 comprises a base plate 7, and essentially U-shaped locking strut 8 which embraces the arcuate part 3 of the bottom structure, and a guide bar 9. As will be seen from the end view in FIG. 3, the base plate 7 has provided at its lower end an outwardly projecting shoulder 12 which adjoins a channel section 14 comprising a rear wall 16, a bottom wall 18 and a front wall 20. The channel section 14 is intended to receive a rung or crosspiece 22 of a ladder 21, shown in broken lines. Welded to the base plate 7 in the proximity of the shoulder 12 and the channel rear-wall 16 is a downwardly extending arm 25, by means of which the attachment structure 2 is secured to the bottom structure 1 with the aid of a bolt 26 or like fastener. The bolt passes through a bolt hole 28 provided in the cross-strut 5 and located on the centre of the arc of said arcuate part 3.

The locking strut 8 has angled ends 29, which are welded to the base plate 7. The centre part of the locking strut crosses the arcuate part 3 in a chordal manner and has located centrally thereon a hole for accommodating a screwthreaded handle 30. The handle 30 of the illustrated embodiment comprises a screwthreaded rod having welded thereto a nut, which acts as a stop means, and an angled handgrip part. It will be understood, however, that the handle may have a form different to that shown. The screwthreaded part of the handle extends beneath the arcuate part 3 and is screwed into a screwthreaded hole or, e.g., into a nut 31 welded to the base plate 7. When the handle 30 is turned in the appropriate direction, the locking strut 8 is urged against the arcuate part 3 so as to secure the attachment structure 2 in its selected position of inclination.

The guide bar 9 may comprise a section profile or a tube of square cross-section and carries twoslide sleeves 32 of corresponding shape. The guide bar 9 may have any desired form, however, e.g. may consist of a flat-iron element, round bar or round tube. Each of the slide sleeves 32 carries a respective socket 34 which extends at right angles to the guide bar 9 and the base plate 7 and which is intended to receive a respective attachment hook 36, the hooks having screwthreaded shanks on which nuts 38 are screwed.

The guide bar 9 preferably has fitted to the ends thereof stop means 39 for preventing the sleeves from sliding from the ends of the guide bar. These stop means may consist of pin bolts or the like, shown only in FIG. 2.

The adjustable base assembly is used and functions in the following manner. A ladder is positioned with its lowermost rung 22 in the channel section 14 of the ladder attachment structure 2. The ladder is then positioned so that the sidepieces 40 thereof abut the guide bar 9, whereafter the slide sleeves 32 are moved towards the ladder sidepieces, either from outside the ladder or from inside thereof, and the attachment hooks 36 are engaged around the sides of respective ladder sidepieces remote from the guide bar 9. The nuts 38 are then tightened, so as to clamp the ladder firmly against the guide bar 9, with the rung or cross member 22 of the ladder anchored in the channel section 14 and resting against the bottom wall thereof. The ladder is then raised to its intended position and the bottom structure is positioned so that the footplate devices are in positive and reliable engagement with the underlying foundation surface, with the ladder extending straight up, i.e. not leaning to one side. With the ladder and the bottom structure in this position, the handle 30 is turned in a tightening direction, so that the ladder attachment structure, and therewith the ladder, is held firmly in position relative to the bottom structure 1 and therewith relative to the underlying foundation surface.

The inventive adjustable base assembly is not restricted in use to the positioning of a ladder or some other elongated object on an uneven foundation surface, so that the ladder or object will not lean to one side, since the inventive assembly can also be used to support an object at a given angle of inclination. The foundation surface in this regard may be flat or sloping. Examples of this are found in certain types of working platforms.

Figure 7:
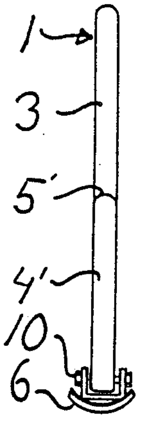
FIGS. 7 and respectively a view and a side view of an alternative embodiment of a bottom structure for the inventive base assembly.
Figure 8:
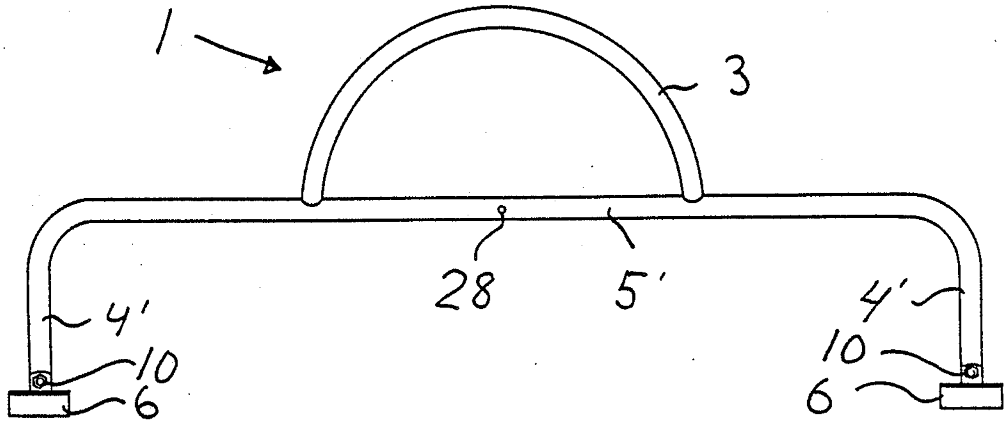

When the object supported by the base assembly is inclined, it is often necessary to provide a broad supporting base, in order to afford the stability desired. The embodiment illustrated in FIGS. 7 and 8 is particularly suitable in this regard. With this embodiment the arcuate part is attached to an extended cross-strut 5', the outwardly extending ends of which are curved downwardly to form legs 4'. This embodiment can be used to great advantage when the inventive base assembly is to be placed on a foundation surface which slopes very steeply, e.g. a flight of stairs or steps, where the available base for a ladder is dangerously narrow.

Figure 6:
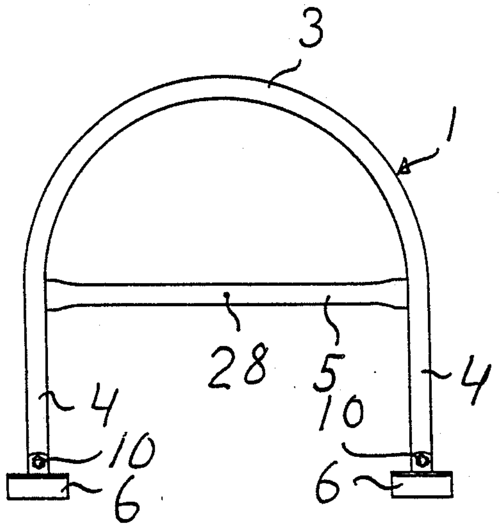
FIGS. 5 and 6 are respective side views of a bottom structure forming part of the base assembly of FIG. 1.
Figure 5:
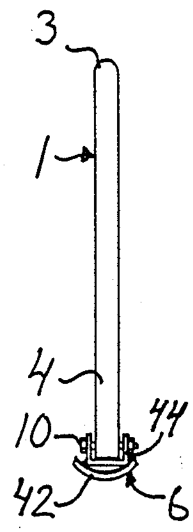

The embodiment illustrated in FIGS. 5 and 6 includes a bottom structure which comprises an arcuate part 3, which in this case encompasses a full semi-circle, and mutually parallel legs 4. This embodiment enables the ladder attachment structure 2 to be inclined pronouncedly in relation to the bottom structure 1, namely to an inclined position in which the handle 30 will strike the cross-strut 5. With the embodiment of FIGS. 1-4 on the other hand, the maximum extent to which the bottom structure 1 can be inclined relative to the attachment structure 2 is restricted by the position in which the angled ends 29 of the locking strut 8 come into contact with the legs 4, which in this case are divergent. In the case of this embodiment there is obtained a larger base area at the cost of a smaller angle of inclination.

It is preferred that the bottom structure 1, and in particular its arcuate part 3, is made of round tubing. This provides a lightweight structure of maximum strength at low manufacturing costs.

As illustrated in the drawings, the footplate device 6 comprises a sole plate 42 which has welded thereto a U-shaped section 44, the opposing walls of which have provided therein holes for receiving said bolts 10. The bolts 10 extend perpendicularly to the plane of the bottom structure 1 and the footplate constructure enables the plates to be inclined at different angles in relation to the plane of the bottom structure. In accordance with the invention, the plates 42 have a rounded cross-section when seen at right angles to the plane of the bottom structure 1. This enables good abutment with the foundation surface to be achieved when the surface is inclined in a plane which extends perpendicularly to the plane of the bottom structure, or when the bottom structure is itself inclined. This good abutment with the foundation surface can be achieved with the aid of substantially tightly fitting bolts 10, without the need for universal joints or for other constructions which are prone to wear and which impair the mechanical strength or stability of the assembly. The plates 42 may optionally have a partially U-shaped configuration and a rounded centre part with straight legs extending therefrom. A footplate device of this construction will have good abutment with hard foundation surfaces. By giving the rounded centre part a small radius of curvature, a footplate device can be provided which will penetrate a soft foundation surface, therewith providing a firm support.

The base plate 7 may be given a length which will enable the bolt 26 to be secured to the base plate instead of to a separate upward arm. It is particularly important in this case to ensure that there is sufficient clearance which prevents the bolt from coming into contact with the ladder rung.

The channel section 14 of the illustrated embodiment has right-angled corners and mutually parallel sides. Consequently, if the rung 22 does not fill the channel section completely there will be a considerable clearance between the rung 22 and the channel walls. When the ladder is inclined, this clearance will normally not present a problem, since when the rung 22 is subjected to load it will adopt a stable position in abutment with the rear wall 16. If the ladder is then inclined in the opposite direction, with the base assembly thus reversed and the handle 30 facing the use, the ladder rung 22 will take a stable position in abutment with the front wall 20 of the channel section. In order to positively govern the position of the ladder rung, or the essentially horizontal structural part of some corresponding object, the channel section 16 can be made to taper towards the bottom wall thereof, by inclining the rear wall 16 and/or the front wall 20 outwardly towards the channel aperture, or the bottom wall 18 of the channel section can be made to slope. The ladder rung 22 can also be secured in the channel section 14 with the aid of clamping screws provided in the front wall of said channel preferably at the ends thereof.

The channel section 14 need not necessarily be a continuous structure, but may present one or more interruptions or may comprise one or more downwardly extending hooks which together form a channel profile. According to a preferred embodiment, however, the channel section 14 is a continuous structure and is formed integrally with the base plate 7. In this way the position of the channel section in relation to the base plate 7 can be determined very precisely in a simple manner, in combination with simple and rational manufacture at low costs, by sheet-metal bending.

The attachment hooks 36 illustrated in the Figures may be replaced with a movable clamping rod which together with the bar 9 embraces the sidepieces 40 of the ladder or like object and urged thereagain by means of attachment bolts. The attachment bolts are preferably arranged in the movable rod and the bar 9, preferably at the ends thereof at a location corresponding to the stop means 39.

The nuts of the attachment bolts and also the nuts of the attachment hooks 36 may be wing nuts or may have welded thereto a handle or like grip to enable the nuts to be tightened manually without the need of a tool herefor.

The described and illustrated embodiment is not limitive of the scope of the invention, since modifications can be made by combining the features illustrated and described within the scope of the inventive concept, as defined in the following claims.

I claim:

1. An adjustable base assembly for supporting a ladder or like object (21) for compensating for an uneven foundation surface and/or to enable the ladder or like object to be inclined at a desired angle, the assembly comprising an arcuate bottom structure (1) which includes footplate devices (6) which can be brought into contact with said foundation surface, and a part-circular, upper arcuate part (3) whose ends are mutually connected by a cross-strut (5, 5'), and further comprising an attachment structure (2) which is pivotally mounted to the bottom structure and which is intended to support the ladder or like object at a distance from the foundation surface, a spacer means (7) is pivotally mounted on said strut (5, 5') in the centre (28) of curvature of the arcuate part (3), characterized in that the attachment structure includes an upper, transversely extending bar (9) which carries holder means (36) for embracing and securing sidepieces (40) of the ladder, said bar (9) being firmly connected via said spacer means (7) with a lower, transversely extending and upwardly open channel section (14) which is intended to receive a ladder rung (22); and in that said spacer means (7) presents an upper, transversely extending U-shaped strut (8) which embraces the arcuate part, said U-shaped strut (8) extends across the arcuate part (3) in a chordal manner; and in that said U-shaped strut is clamped with a friction-locking action against said arcuate part (3) with the aid of a clamping device which extends centrally through the U-shaped strut and which can be screwed into said spacer means (7).

2. An assembly according to claim 1, characterized in that said spacer means comprises a base plate (7) which is formed integrally with the upwardly open channel section (14).

3. An assembly according to claim 2, characterized in that said base plate has provided at the bottom thereof a shoulder (12) which projects outwardly away from said bottom structure (1) and the outer end of which adjoins said channel section (14).

4. An assembly according to claim 1, characterized in that the spacer means (7) presents at the bottom thereof a downwardly projecting arm (24) which can be connected to the transverse strut (5).

5. An assembly according to claim 4, characterized in that the spacer means (7) has provided at the bottom thereof a shoulder which projects outwardly from the bottom structure (1) and the outer end of which adjoins said channel section (14); and in that said arm (24) is attached to a rear wall (16) of the channel section (14) and to said shoulder (12); and in that said arm has substantially the same thickness as the width of the shoulder (12).

6. An assembly according to claim 1, characterized in that said holder means comprise attachment hooks (36) which can be brought to a clamping position by means of screw threads and which are arranged on said transverse bar (9) through the medium of slide sleeves (32), said slide sleeves, when the attachment hooks are not in their clamping position, being displaceable along the bar, and, with the hooks in their clamping position, are held in position on said bar (9) by means of frictional forces.

7. An assembly according to claim 1, characterized in that the bottom structure (1) thereof rests on footplate devices (6) which are journalled on bolts which extend perpendicularly to the plane of the bottom structure; and in that the footplate devices include plates (42) which, perpendicularly to the plane of the bottom structure (1), present in at least their central parts a curved cross-section with a downwardly directed hump.

8. An assembly according to claim 1, characterized by said cross strut (5') which is extended beyond the ends of the arcuate part (3) and the ends of said cross strut present downwardly bent ends provided with footplate devices (6).

* * * * *